US012206208B2

(12) United States Patent
Liu

(10) Patent No.: US 12,206,208 B2
(45) Date of Patent: Jan. 21, 2025

(54) CONNECTOR WITH LINKED RETAINING MECHANISM

(71) Applicant: Mantis Yesway Co., Ltd., New Taipei (TW)

(72) Inventor: Da-Yu Liu, New Taipei (TW)

(73) Assignee: Mantis Yesway Co. , Ltd., New Taipei (TW)

( * ) Notice: Subject to any disclaimer, the term of this patent is extended or adjusted under 35 U.S.C. 154(b) by 324 days.

(21) Appl. No.: 17/725,554

(22) Filed: Apr. 21, 2022

(65) Prior Publication Data

US 2023/0344170 A1 Oct. 26, 2023

(51) Int. Cl.

| | |
|---|---|
| ***H01R 13/633*** | (2006.01) |
| ***H01R 13/24*** | (2006.01) |
| ***H01R 13/627*** | (2006.01) |
| ***H01R 13/639*** | (2006.01) |

(52) U.S. Cl.

CPC ....... *H01R 13/639* (2013.01); *H01R 13/2407* (2013.01); *H01R 13/6275* (2013.01); *H01R 13/633* (2013.01)

(58) Field of Classification Search

None

See application file for complete search history.

(56) References Cited

U.S. PATENT DOCUMENTS

| | | | | |
|---|---|---|---|---|
| 6,976,865 | B2 * | 12/2005 | Wu | H01R 13/6275 439/352 |
| 8,787,025 | B2 * | 7/2014 | Wu | H01R 13/6275 361/755 |
| 9,728,871 | B1 * | 8/2017 | Gutgold | H01R 12/52 |
| 10,461,473 | B1 * | 10/2019 | Hsiao | H01R 13/6335 |
| 10,795,101 | B2 * | 10/2020 | Dong | G02B 6/4261 |
| 11,228,140 | B2 * | 1/2022 | Hsiao | H01R 13/6335 |
| 11,289,851 | B2 * | 3/2022 | Truong | H01R 13/6335 |
| 11,322,887 | B2 * | 5/2022 | Hsu | H01R 12/79 |
| 11,450,988 | B2 * | 9/2022 | Li | H01R 13/6335 |
| 11,462,856 | B2 * | 10/2022 | Phillips | H01R 12/7005 |
| 11,688,975 | B2 * | 6/2023 | Truong | H01R 13/6275 439/345 |

* cited by examiner

*Primary Examiner* — Felix O Figueroa

(74) *Attorney, Agent, or Firm* — Demian K. Jackson; Jackson IPG PLLC

(57) ABSTRACT

A connector includes an enclosure having a top wall provided with a fitting and a mounting section; a retaining member including a main body fitted in the fitting section, an extended section extended forward from the main body and having a hook section projected beyond the top wall for retaining a mating female connector thereto, and an elastic section extended rearward from the main body and located in the mounting section; and a linkage assembly holding the retaining member between it and the mounting section and including a first linking member located above the elastic section and a second linking member connected to the first linking member and the enclosure. When the second linking member is pulled, the first linking member is brought to push the elastic section downward, such that the main body, the extended section and the hook section elastically bias downward simultaneously to release the female connector.

9 Claims, 11 Drawing Sheets

(A-A profile)

(B-B profile)

(B-B profile)

(A-A profile)

(B-B profile)

CONNECTOR WITH LINKED RETAINING MECHANISM

FIELD OF THE INVENTION

The present invention relates to a connector, and more particularly, to a connector with linked retaining mechanism that ensures improved electrical connection and disconnection to and from another mating connector.

BACKGROUND OF THE INVENTION

Owing to the constant progress in scientific techniques, the development of many consumptive electronic products, such as computers, has been turned to have more powerful and speedy computing function and more compact volume. Under this condition, the communication ports on the computers become less in number than before. The communication port may appear as a plug having right specifications and for use with other equipment by plugging it in a mating female connector to enable an electrical connection between the plug and the mating female connector for signal transmission.

The communication port on the electronic equipment is usually in the form of a receptacle or female connector for receiving a plug having a cable connected thereto, the latter is also referred to as a wired plug or connector. People tend to disconnect the wired plug/connector from the female connector by pulling the connected cable directly. In the case the wired plug/connector is not provided with any supporting or fixing structure and is subjected to an upward or downward external force after being connected to the female connector, the wired plug/connector tends to vibrate relative to or even loosen from the female connector that is not additionally supported on or retained to the wired plug/connector, resulting in poor signal transmission.

SUMMARY OF THE INVENTION

To effectively solve the above problem, a primary object of the present invention is to provide a connector with linked retaining mechanism, which includes a connector having an enclosure, a first linking member, a second linking member connected to the enclosure and the first linking member, and a retaining member having a hook section upward projected beyond the enclosure for retaining a mating female connector thereto. When the second linking member is pulled, the first linking member is brought to downward press against the retaining member, so that the hook section simultaneously elastically biases downward by a distance to release the mating female connector. With these arrangements, the connector with linked retaining mechanism according to the present invention is simple in structure and easy to operate, and enables firm and highly reliable electrical connection to the mating female connector.

Another object of the present invention is to provide a connector with linked retaining mechanism, which is easy to operate and ensures secured plugging in a mating female connector without the risk of loosening from or vibrating relative to the mating female connector, so as to achieve exact electrical connection between the two connectors.

To achieve the above and other objects, the connector with linked retaining mechanism according to the present invention includes a connector, a retaining member, and a linkage assembly. The connector has an enclosure including a top wall, two sidewalls, a first end and a second end. The first end and the second end are located on a surface of the top wall opposite to the sidewalls and located corresponding to a front and a rear part, respectively, of the top wall. A circuit board and a cable are received in the enclosure corresponding to the first end and the second end, respectively. The top wall is provided with a fitting section located corresponding and oriented to the first end and a mounting section located adjacent to the second end. The retaining member includes a main body fitted in the fitting section, at least one extended section forward extended from the main body, and at least one elastic section. The extended section is provided with a hook section upward projected beyond the top wall for retaining a mating female connector thereto; and the elastic section is rearward extended from the main body in a direction opposite to the extended section to be located in the mounting section. The linkage assembly is connected to the mounting section of the connector to hold the retaining member in place between the mounting section and the linkage assembly. The linkage assembly includes a first linking member and a second linking member. The second linking member is connected to the first linking member and the connector; and the first linking member is located above the elastic section and includes a pressing section. When the second linking member is pulled rearward, it brings the first linking member to move simultaneously for the pressing section of the first linking member to push the elastic section downward, so that the main body, the extended section and the hook section are brought to elastically bias downward by a distance simultaneously.

In the above connector with linked retaining mechanism, the retaining member is held in place between the mounting section and the first linking member with the main body and the extended section of the retaining member being fitted in the fitting section, the second linking member is connected to the first linking member and the enclosure of the connector, and the hook section on the extended section is normally upward projected beyond the top wall of the enclosure for retaining a mating female connector thereto. However, when the second linking member is rearward pulled, the first linking member is brought to move forward simultaneously and the pressing section pushes the elastic section downward. At this point, the hook section is brought to elastically bias downward simultaneously and release from the mating female connector. With these arrangements, the present invention provides reliable retaining and releasing of the mating female connector to and from the connector and enables convenient electrical connection between the two connectors.

BRIEF DESCRIPTION OF THE DRAWINGS

The structure and the technical means adopted by the present invention to achieve the above and other objects can be best understood by referring to the following detailed description of the preferred embodiment and the accompanying drawings, wherein.

DETAILED DESCRIPTION OF THE PREFERRED EMBODIMENTS

The present invention will now be described with a preferred embodiment thereof.

Figure 1:
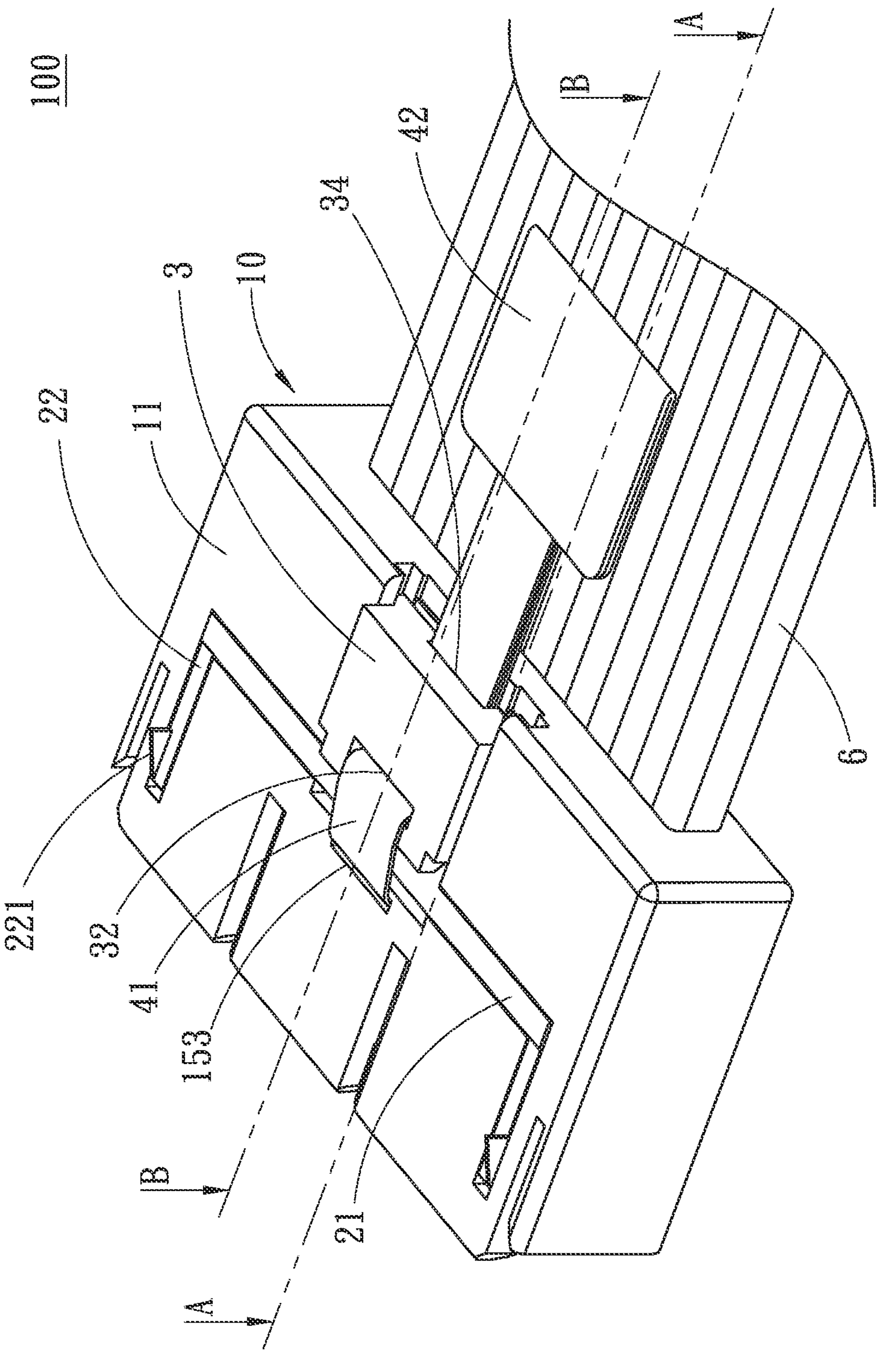
FIG. 1 is an assembled perspective view of a connector with linked retaining mechanism according to a preferred embodiment of the present invention.
Figure 2:
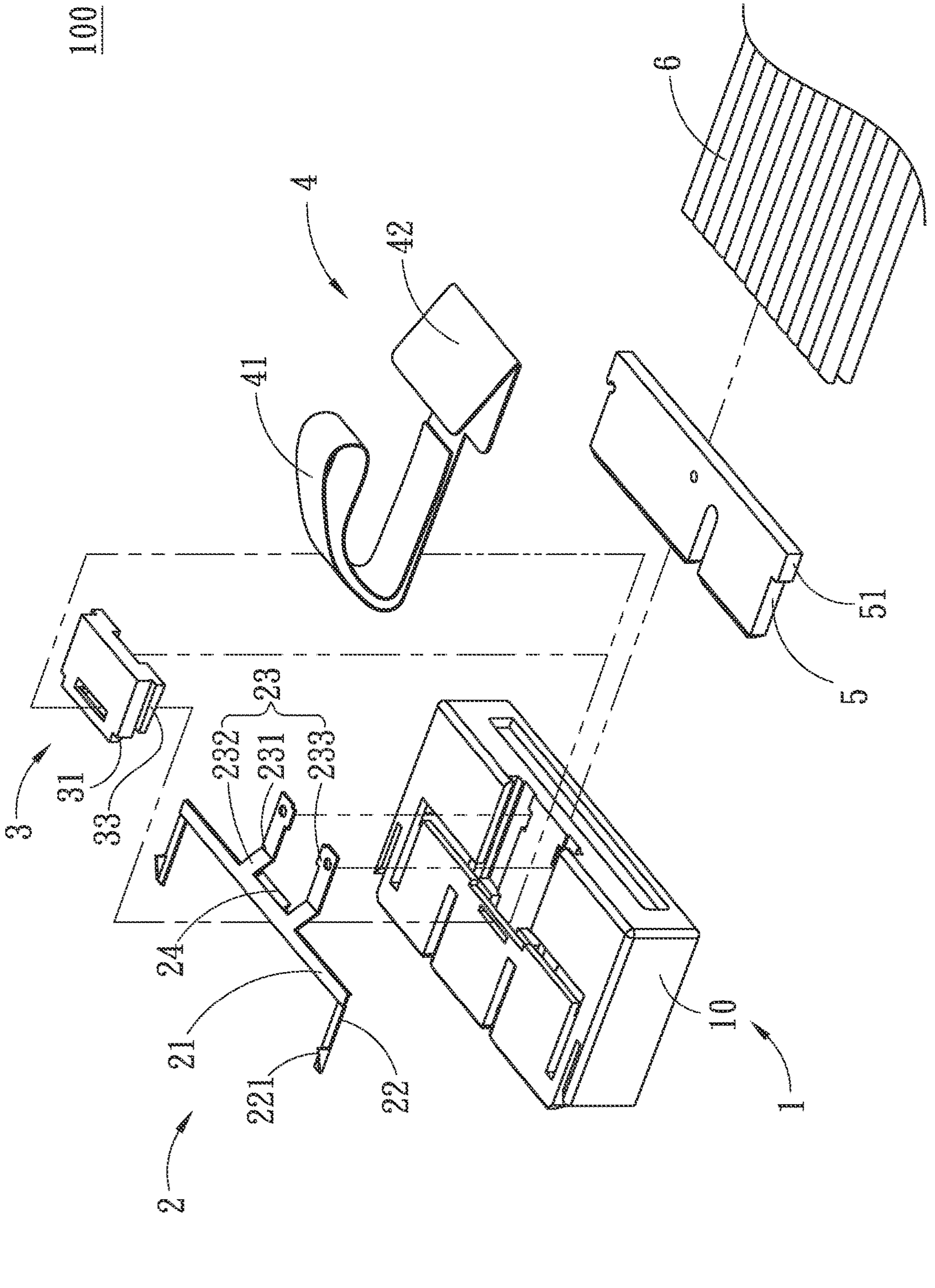
FIG. 2 is an exploded perspective view of FIG. 1.
Figure 7:
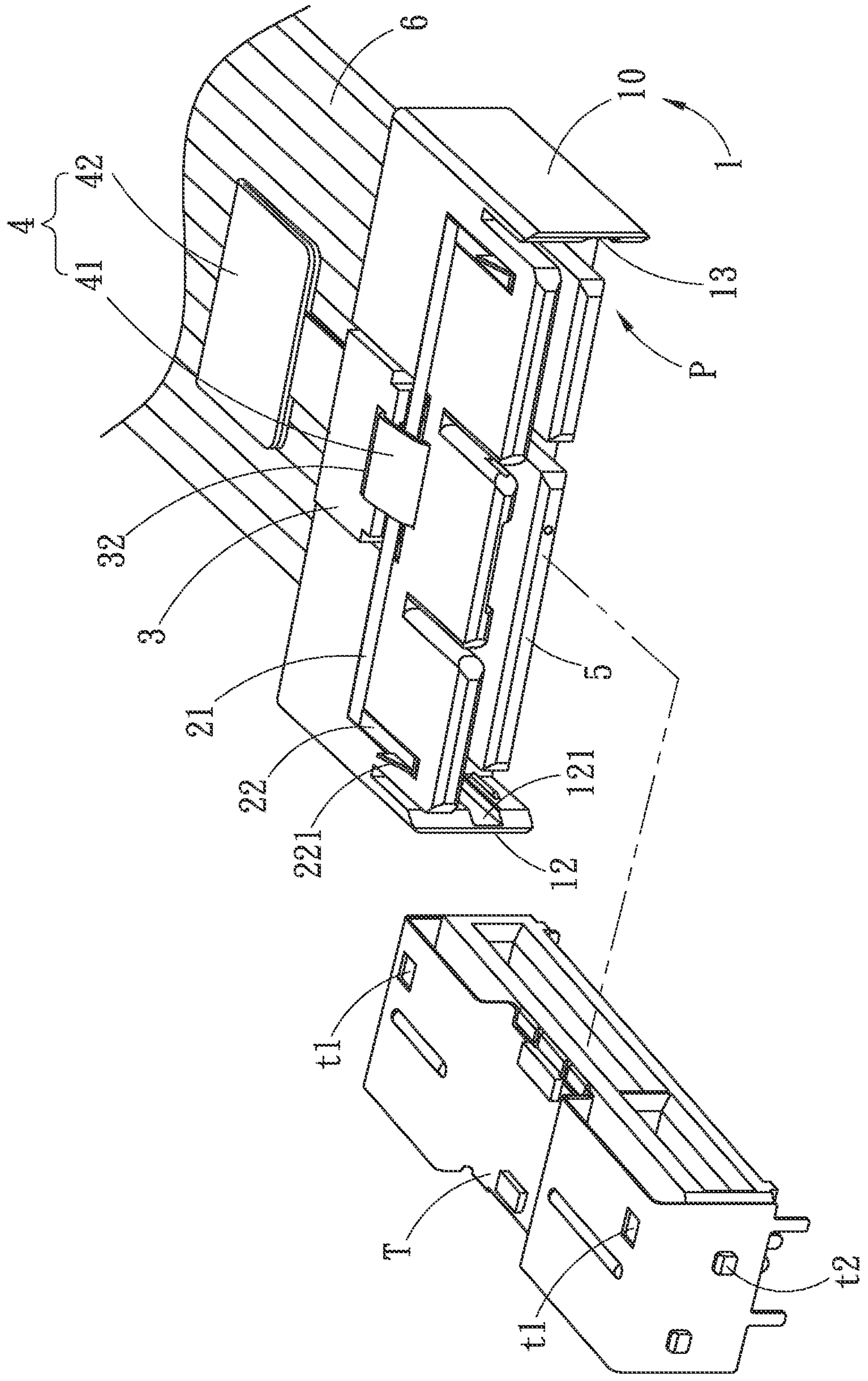
FIG. 7 is an exploded perspective view showing the connector with linked retaining mechanism according to the present invention and a mating female connector thereof.

Please refer to FIGS. 1 and 2, which are assembled and exploded perspective views, respectively, of a connector with linked retaining mechanism according to a preferred embodiment of the present invention, which is integrally denoted a reference numeral 100 herein for the purpose of clarity. As shown, the connector with linked retaining mechanism 100 includes a connector 1, a retaining member 2, and a linkage assembly. As shown in FIG. 7, the connector with linked retaining mechanism 100 can be plugged in a mating female connector T having catch openings t1 formed on a top thereof, so as to enable electrical connection between the two connectors for signal transmission.

The connector 1 includes an insulating enclosure 10, a circuit board 5, and a cable 6. Please refer to FIGS. 3A and 3B, which are top and bottom perspective views, respectively, of the enclosure 10 of the connector 1. As shown, the enclosure 10 includes a top wall 11, two sidewalls 12, a first end 13, and a second end 14. The two sidewalls 12 are located at and below two laterally opposite sides of the top wall 11, i.e. a left and a right side of the top wall 11, to space from each other. The first end 13 and the second end 14 are located on a surface of the top wall 11 opposite to the sidewalls 12 and corresponding to two axially opposite parts of the top wall 11, i.e. a front and a rear part of the top wall 11. The top wall 11 has a fitting section 15 and a mounting section 16 provided on an upper surface thereof. The fitting section 15 is located corresponding and oriented to the first end 13, while the mounting section 16 is located adjacent to the second end 14. In the illustrated preferred embodiment, the first end 13 is configured as an interface for plugging in the mating female connector T. The second end 14 is configured as a back wall having an insertion opening 141 formed thereat. The interface at the front end 13 and the insertion opening 141 at the second end 14 are communicable with each other. Thus, the top wall 11, the two sidewalls 12, the first end 13 and the second end 14 together define a receiving space P in the enclosure 10, as indicated in FIGS. 4A and 7, for receiving the circuit board 5 and the cable 6 therein. And, a front part of the mating female connector T is partially received in the receiving space P to electrically connect with the circuit board 5 when the connector 1 is plugged in the mating female connector T.

Figure 3A:
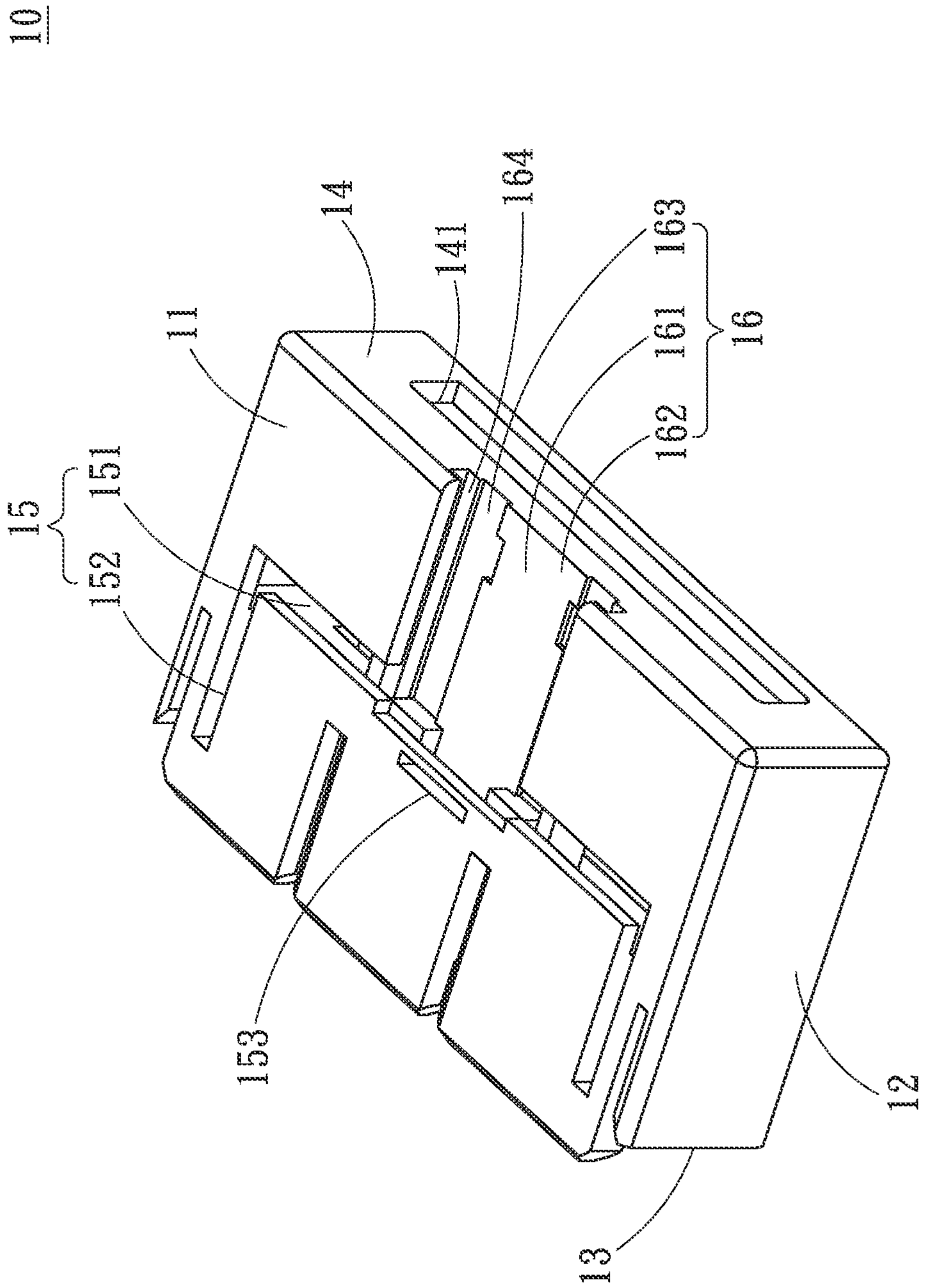
FIGS. 3A and 3B are top and bottom perspective view, respectively, of an enclosure of the connector of FIG. 1.
Figure 3B:
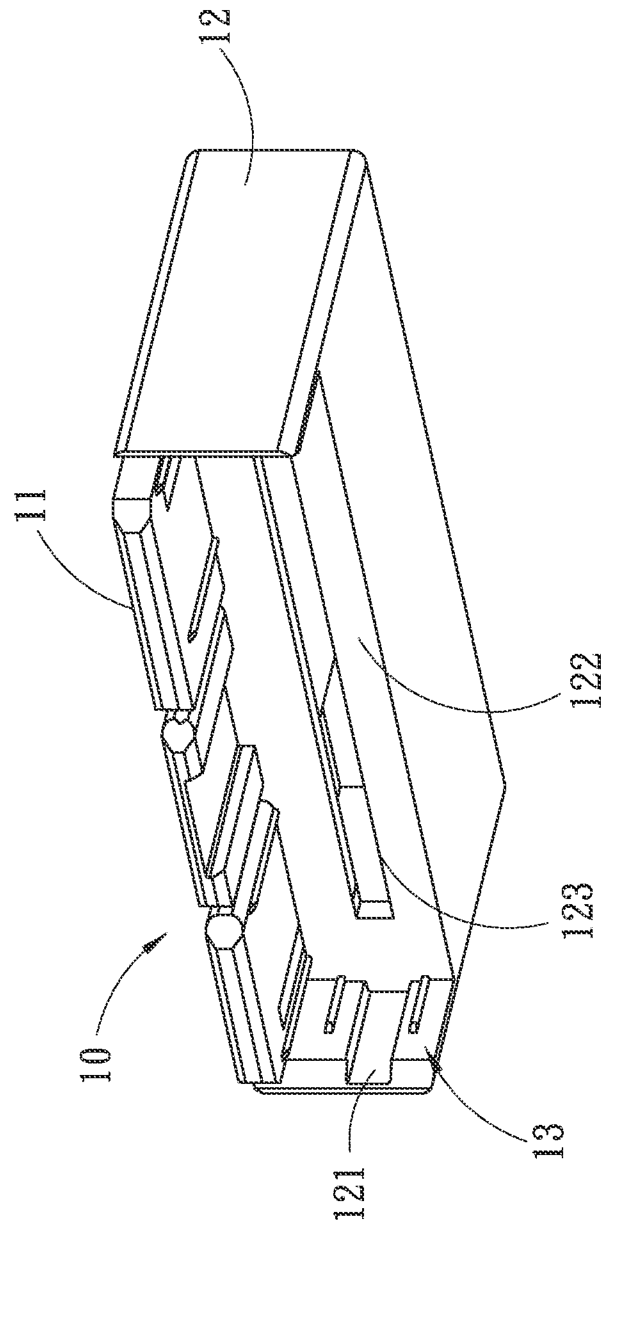
Figure 4A:
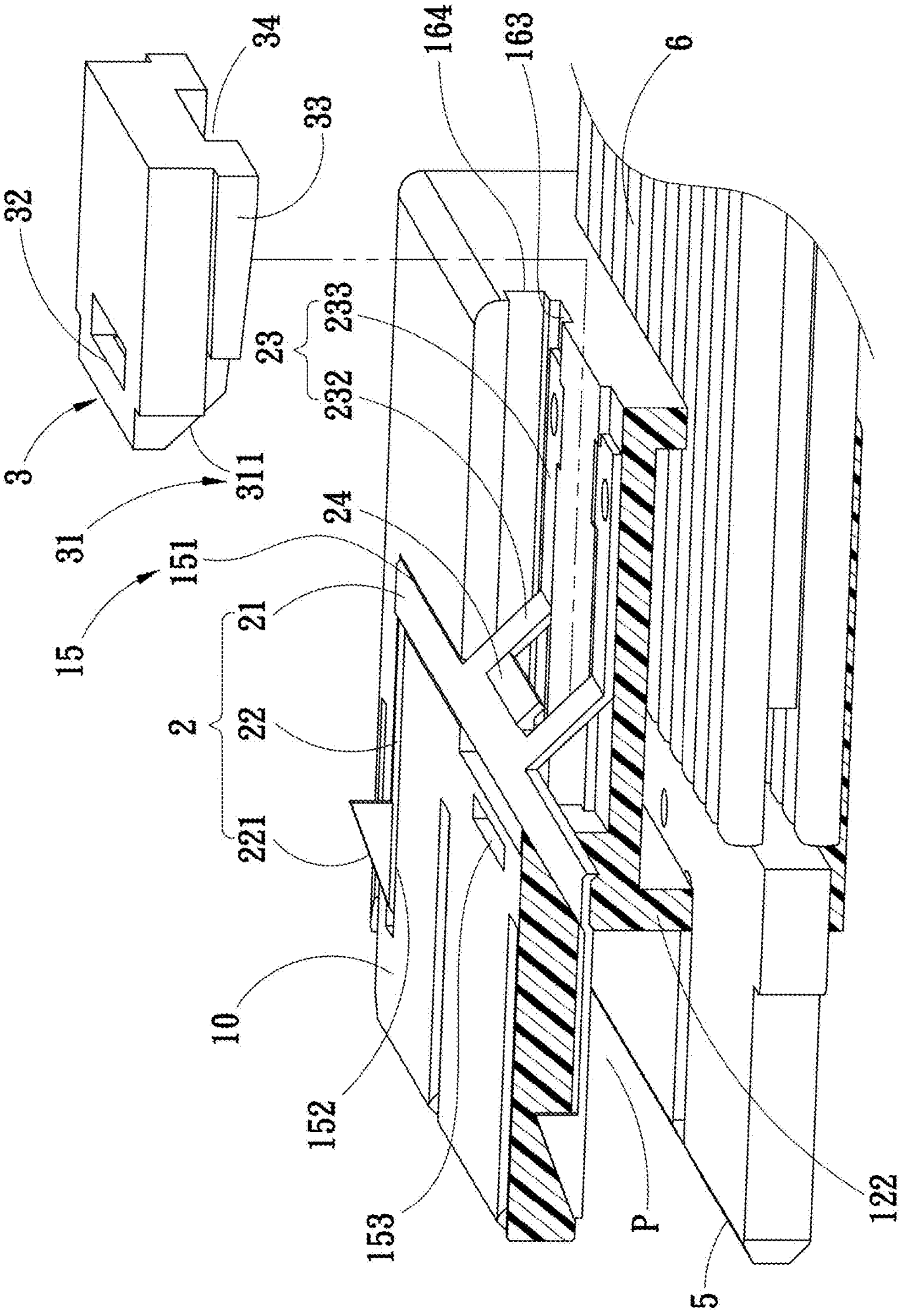
FIG. 4A is a cutaway view taken along line A-A of FIG. 1 before the first linking member is assembled to the enclosure of the connector.

More specifically, as can be seen in FIG. 3A, the fitting section 15 is provided with a fitting groove 151 and two narrow slots 152 perpendicularly and communicably extended from two opposite ends of the fitting groove 151. The fitting groove 151 is extended parallel to the first end 13 and located adjacent to the mounting section 16; and the narrow slots 152 respectively have a free end located near the first end 13. There is further a connecting slot 153 formed at a rear central area of the fitting section 15 farther away from the mounting section 16 to downward extend through the fitting section 15. The connecting slot 153 is located close to and communicable with the fitting groove 151.

Also can be seen in FIG. 3A, the mounting section 16 includes a receiving recess 161 sunken into the top wall 11, and a recessed bottom surface 162 formed at a bottom of the receiving recess 161 and extended parallel to the top wall 11. The receiving recess 161 has an end intersects and communicates with the fitting groove 151 and the connecting slot 153 of the fitting section 15, and another end communicates with the second end 14.

Further, the mounting section 16 includes two limiting grooves 163 formed at two opposite lateral sides of the recessed bottom surface 162 that are located farther away from the fitting groove 151. The limiting grooves 163 are vertically sunken into the recessed bottom surface 162. And, two horizontal guiding rails 164 are sideward recessed into two laterally opposite sides of the receiving recess 161 and are respectively located adjacent to the limiting grooves 163.

Figure 4B:
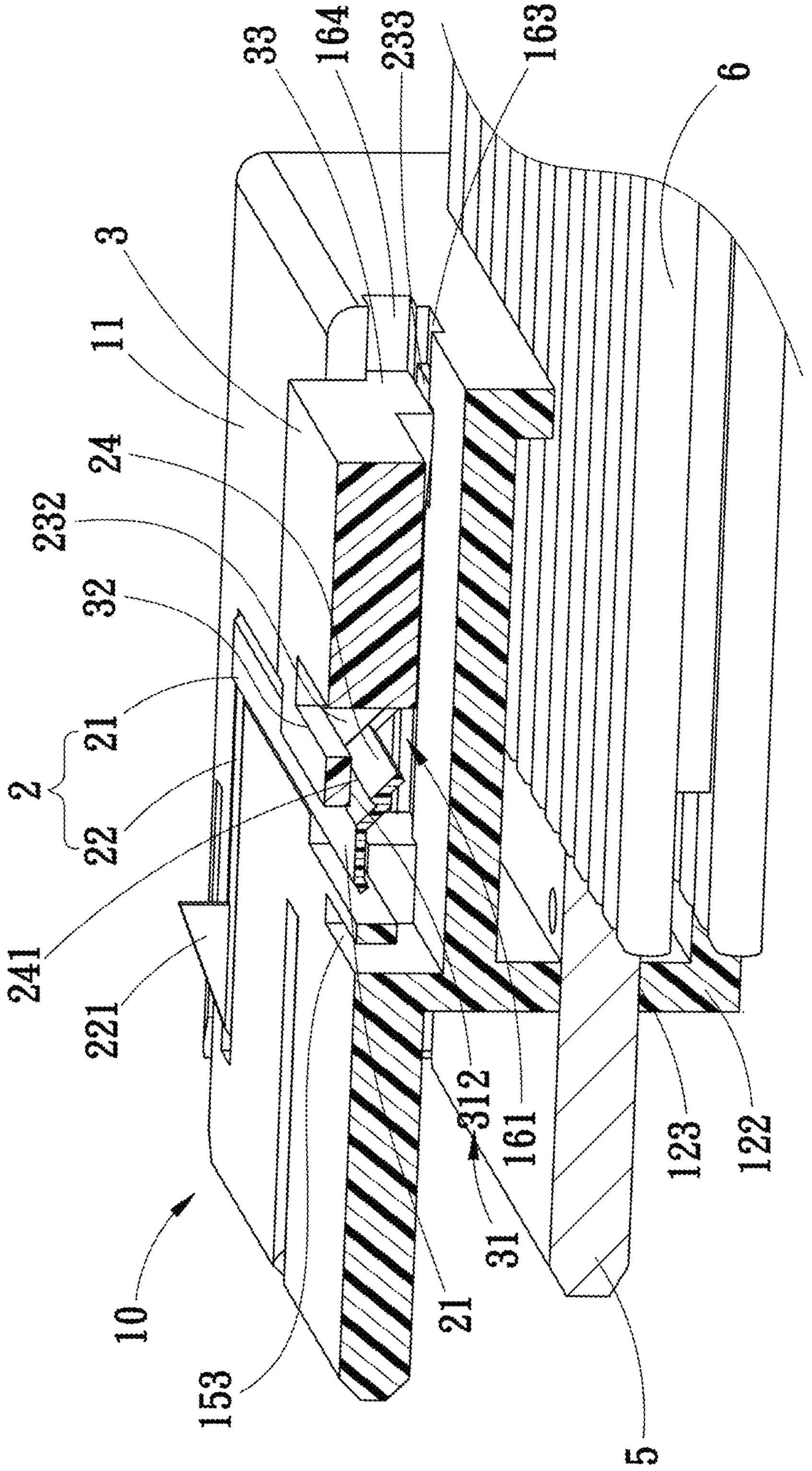
FIG. 4B is a cutaway view taken along line B-B of FIG. 1 before a second linking member is assembled to the connector.

FIG. 4A is a cutaway view taken along line A-A of FIG. 1. Please refer to FIGS. 3A, 3B and 4A. The two sidewalls 12 are respectively provided on an inner side closer to the first end 13 with a horizontal rail 121; and a guiding wall 122 is transversely formed between the two inner sides of the two sidewalls 12 to partition the receiving space P into two subspaces and has a horizontal guiding slot 123 formed thereon to communicate the two subspaces with each other. The circuit board 5 is provided at a front and a rear end thereof with a plurality of contacts (not shown), and has a width between two lateral sides thereof smaller than a transverse size of the guiding slot 123. As can be seen in FIG. 2, the circuit board 5 is further provided at its two laterally opposite sides with an outward extended protruded section 51 each. When a front end of the circuit board 5 is extended through the guiding slot 123, the protruded sections 51 are abutted against portions of the sidewalls 12 located adjacent to two opposite ends of the guiding slot 123 to hold the circuit board 5 in place, such that the contacts at the front end of the circuit board 5 are located in the subspace of the receiving space P at the first end 13 and the contacts at the rear end of the circuit board 5 are welded and accordingly electrically connected to the cable 6, which is extended through the insertion opening 141 at the second end 14 into the subspace of the receiving space P at the second end 14. At this point, the connector 1 is formed, as can be seen in FIGS. 4A and 4B; and the first end 13 of the connector 1 can be plugged in the mating female connector T, as shown in FIG. 7, to electrically connect the circuit board 5 to the mating female connector T.

Please refer to FIG. 2. The retaining member 2 includes a main body 21, at least one extended section 22 forward extended from a lateral end of the main body 21, two elastic sections 23, and a driven section 24. In the illustrated preferred embodiment, there are two extended sections 22 separately extended from two lateral ends of the main body 21. The elastic sections 23 and the driven section 24 are slantly extended downward from the main body 21 in a direction opposite to the extended sections 22. The extended sections 22 are located on the same horizontal plane as the main body 21 and are provided at respective free end with an upward projected hook section 221 for correspondingly hooking to the catch openings t1 on the mating female connector T.

As can be seen in FIGS. 2 and 4A, the retaining member 2 is assembled to the enclosure 10 with the main body 21 and the extended sections 22 being fitted in the fitting groove 151 and the narrow slots 152 of the fitting section 15, respectively, and the elastic sections 23 and the driven section 24 being received in the receiving recess 161 of the mounting section 16. The elastic sections 23 are downward slanted by a proper length and then turned at a bent section 231 to extend horizontally rearward by a predetermined length, such that the elastic sections 23 are divided by the bent sections 231 into a first segment 232 and a second segment 233 each. The bent sections 231 are in the form of a bending line, at where the elastic sections are angularly bent to extend toward the receiving recess 162 of the mounting section 16. The first segments 232 of the elastic sections 23 are connected with the main body 21 and slantly downward extended from the main body 21 to the second segments 233. The second segments 233 are extended in a direction parallel to the main body 21, such that the second segments 233 and the first segments 232 are angularly connected and are located at different height positions relative to the main body 21. Further, the second segments 233 are separately limited to the limiting grooves 163 formed at two lateral sides of the recessed bottom surface 162. Since the first segments 232 and the second segments 233 provide the elastic sections 23 with a continuously extended structure, the elastic sections 23 would produce a downward elastic force when the first segments 232 are subjected to a downward pressure. The driven section 24 is connected to the main body 21 and located between the two first segments 232 of the two elastic sections 23. As can be seen in FIG. 4B, which is a cutaway view taken along line B-B of FIG. 1, the driven section 24 has a pressure receiving segment 241, which can be downward pressed to cause a downward movement of the driven section 24. When the elastic sections 23 and the driven section 24 are downward moved, they bring the main body 21, the extended sections 22 and the hook sections 221 to simultaneously elastically bias downward by a distance.

Figure 3C:
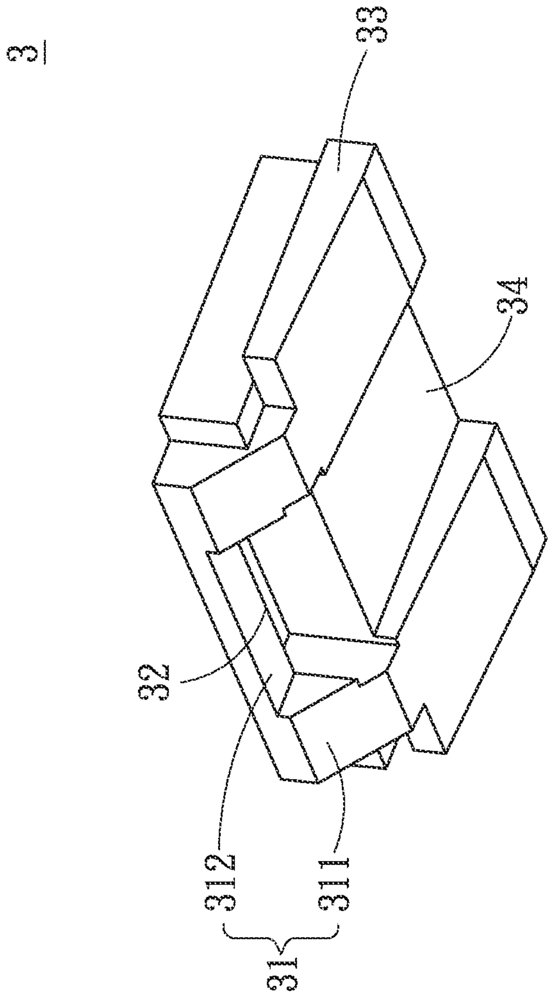
FIG. 3C is a bottom perspective view of a first linking member included in the present invention.

The linkage assembly is mounted to a top of the mounting section 16 of the enclosure 10, and the retaining member 2 is located between the mounting section 16 and the linkage assembly. The linkage assembly includes a first linking member 3 and a second linking member 4. Please refer to FIGS. 2 and 3C. The first linking member 3 is located above the elastic sections 23 and the driven section 24 of the retaining member 2, and includes a pressing section 31, an extend-through slot 32, two sliding blocks 33, and an interspace 34. The pressing section 31 includes two first pressing areas 311, which are located at a lower front edge of the first linking member 3 and are respectively configured as a beveled pressing surface; and a second pressing area 312 located between and recessed from the two first pressing areas 311. The extend-through slot 32 is located in the vicinity of the pressing section 31 and extends from a top to a bottom of the first linking member 3. The two sliding blocks 33 are sideward protruded from two opposite sides of the first linking member 3 that are farther away from the pressing section 31 to thereby be located only at two lower rear lateral sides of the first linking member 3. It is noted the sliding blocks 33 respectively has a thickness smaller than a height of the horizontal guiding rails 164 located at two laterally opposite sides of the receiving recess 161. As can be seen in FIG. 4A, the bottom of the first linking member 3 is downward slanted from a front side toward a rear side, so that a pressing space is formed below the front side of the first linking member 3 relative to the rear side of the first linking member 3, allowing the first linking member 3 to be downward pressed at its front side. Please refer to FIG. 3C again. The interspace 34 is formed at and recessed into a lower central area of the first linking member 3. Please refer to FIG. 2. The second linking member 4 can be configured as a pull belt having a connecting section 41 and a grip section 42 correspondingly connected to the connecting section 41. Please refer to FIG. 5, which is a cutaway view taken along line B-B of FIG. 1. The connecting section 41 is extended through the extend-through slot 32 on the first linking member 3 and the connecting slot 153 and the receiving recess 161 on the enclosure 10 to connect the first linking member 3 and the enclosure 10 to each other and is finally connected to the grip section 42.

Figure 5:
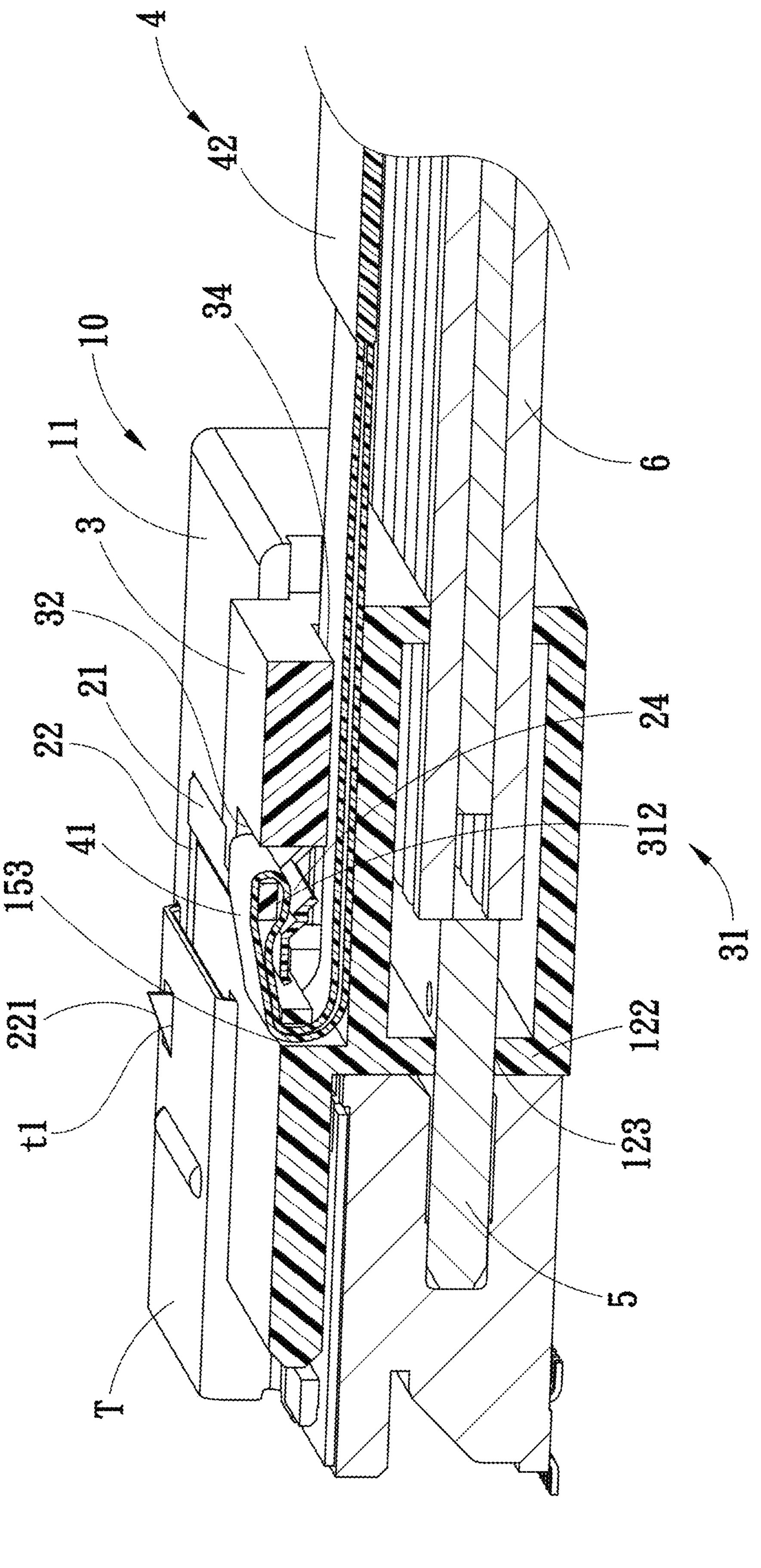
FIG. 5 is a cutaway view taken along line B-B of FIG. 1 showing the second linking member is connected to the first linking member and a retaining member included in the present invention and a mating female connector is connected and retained to the connector of the present invention via the retaining member.
Figure 6A:
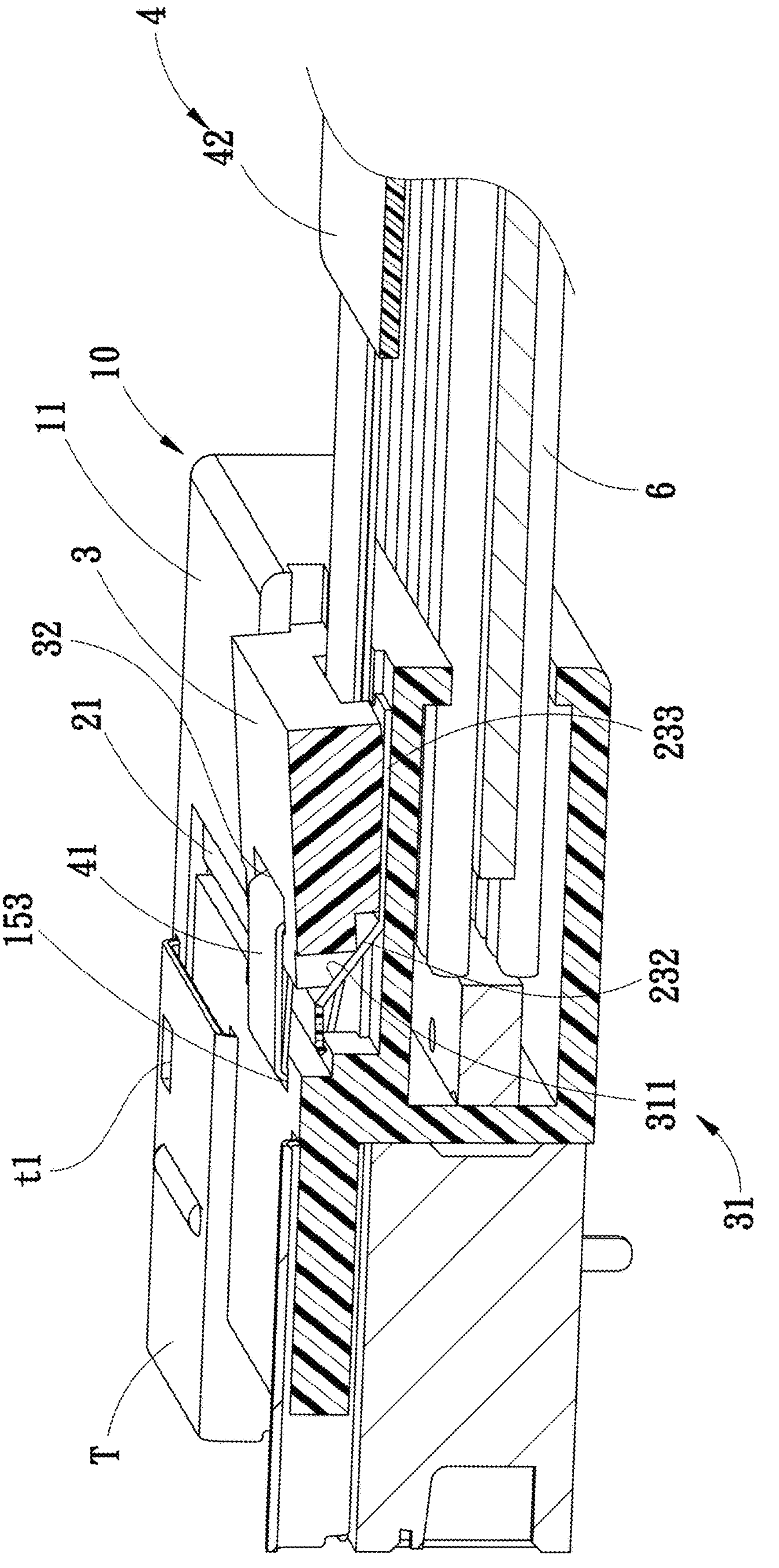
FIGS. 6A and 6B are cutaway views taken along line A-A and line B-B of FIG. 1, respectively, showing how the mating female connector is released and disconnected from the connector of the present invention.
Figure 6B:
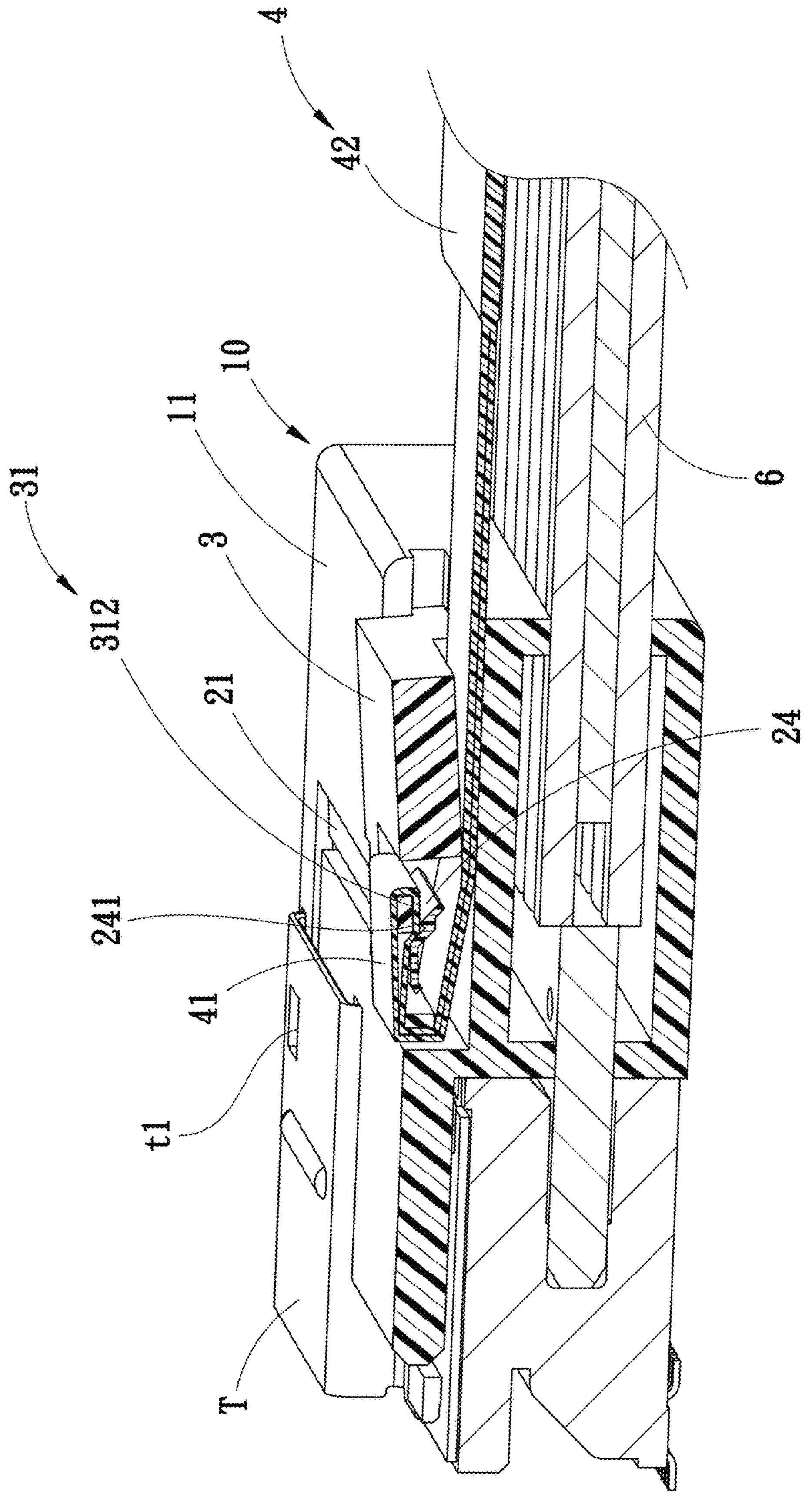

Please refer to FIGS. 1, 2, 3C, 4A, 4B and 5. To assemble the connector with linked retaining mechanism 100, first fit the main body 21 and the extended sections 22 of the retaining member 2 in the fitting groove 151 and the narrow slots 152 of the fitting section 15, respectively. At this point, the hook sections 221 are upward projected from the narrow slots 152 and exposed from the top wall 11 of the enclosure 10; and the elastic sections 23 and the driven section 24 of the retaining member 2 are received in the receiving recess 161 of the mounting section 16 with the second segments 233 of the elastic sections 23 located in and pressed against the limiting grooves 163 formed on the recessed bottom surface 162. With these arrangements, the two elastic sections 23 normally exert a downward elastic force and the hook sections 221 are normally upward projected beyond the top wall 11 of the enclosure 10. Then, connect the first linking member 3 to the enclosure 10 by sliding the two sliding blocks 33 into the two horizontal guiding rails 164 formed on the two lateral sides of the receiving recess 161, so that the first linking member 3 is held in place in the receiving recess 161 on the mounting section 16 of the enclosure 10 and located above the two elastic sections 23 and the driven section 24. At this point, the first pressing areas 311 of the pressing section 31 configured as two beveled pressing surfaces are located corresponding to and above the first segments 232 of the elastic sections 23, and the first segments 232 form two pressure-receiving surfaces (not denoted with reference numerals); the second pressing areas 312 are located above the driven section 24 and corresponding to the pressure receiving segment 241; the extend-through slot 32 is communicable with the receiving recess 161; the bottom of the first linking member 3 is located corresponding to the second segments 233 that are limited to the two limiting grooves 163; the interspace 34 is correspondingly located between the two second segments 233 of the two elastic sections 23 of the retaining member 2; and the top of the first linking member 3 is protruded beyond the mounting section 16. Then, as shown in FIG. 5, extend a first end of the connecting section 41 of the second linking member 4 from an outer side through the interspace 34 of the first linking member 3 and a space between the two elastic sections 23. The second linking member 4 is then extended upward from a lower side through the connecting slot 153 on the enclosure 10 before being further extended upward and then bent to pass the main body 21 of the retaining member 2. Then, the second linking member 4 is sequentially extended upward through the extend-through slot 32 on the first linking member 3 and downward through the connecting slot 153 of the enclosure 10 to extend out of the first linking member 3 into the receiving recess 161 of the mounting section 16. The first end of the connecting section 41 extended out of the first linking member 3 and a second end of the connecting section 41 initially located outside the first linking member 3 are then connected to the grip section 42, and the grip section 42 of the second linking member 4 is then extended closely along the recessed bottom surface 162 toward the cable 6, as shown in FIG. 5.

Please refer to FIGS. 1, 2, 5, 6A, 6B and 7. In the connector with linked retaining mechanism 100 according to the present invention, the second linking member 4 is connected to the extend-through slot 32 of the first linking member 3 and the connecting slot 153 of the enclosure 10 of the connector 1, the first linking member 3 is connected to the mounting section 16 of the connector 1, and the second segments 233 of the retaining member 2 are elastically set in and pressed against the limiting grooves 163, such that the retaining member 2 is held in place between the mounting section 16 and the linkage assembly. When the interface at the first end 13 of the enclosure 10 of the connector 1 is plugged in the front end of the mating female connector T, guiding blocks t2 externally provided on sidewalls of the mating female connector T correspondingly slide into the horizontal rails 121 internally provided on the sidewalls 12 of the connector 1, so that the front end of the mating female connector T can be precisely received in the receiving space P to electrically connect with the circuit board 5 and the upward projected hook sections 221 at the free ends of the two extended sections 22 are also precisely elastically retained in the catch openings t1 formed on the top of the mating female connector T to achieve the purpose of retaining the two connectors 1, T to each other. When the grip section 42 of the second linking member 4, which is closely located on the recessed bottom surface 162, is pulled toward the cable 6, the connecting section 41 of the second linking member 4 is able to move the first linking member 3 simultaneously. Since the top of the first linking member 3 is protruded beyond the top wall 11 of the enclosure 10 and the grip section 42 is closely located on the recessed bottom surface 162, the first linking member 3 is located at a position higher than that of the grip section 42. With these arrangements, the connecting section 41 of the second linking member 4 being pulled rearward would cause the first linking member 3 to move forward, bringing the slant first pressing areas 311 and the second pressing area 312 of the pressing section 31 on the first linking member 3 to push the first segments 232 of the elastic sections 23 and the pressure receiving segment 241 of the driven section 24 to move downward relative to the pressing space. As a result, the main body 21, the extended sections 22 and the hook sections 221 simultaneously elastically bias downward in the fitting groove 151 and the narrow slots 152 by a distance to thereby release and electrically disconnect the connector 1 from the mating female connector T. More specifically, the electrical disconnection solution provided by the present invention ensures precise downward pressing of the pressing section 31 of the first linking member 3 against the elastic sections 23 and the driven section 24 of the retaining member 2 to thereby move them downward, which in turn causes the hook sections 221 of the extended section 22 of the retaining member 2 to simultaneously elastically bias downward by a distance, enabling the connector 1 to precisely release and electrically disconnect from the mating female connector T. Thus, the connector with linked retaining mechanism 100 of the present invention is easy to operate and ensures increased reliability and convenience in retaining and releasing the connector 1 to and from the mating female connector T without the risk of loosening from or vibrating relative to the mating female connector T, and accordingly, ensures exact electrical connection between the two connectors 1 and T.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A connector with linked retaining mechanism, comprising:

a connector having an enclosure including a top wall, two sidewalls, a first end, and a second end; the first end and the second end being located on a surface of the top wall opposite to the sidewalls and located corresponding to a front and a rear part of the top wall, respectively, for receiving a circuit board and a cable, respectively; and the top wall being provided with a fitting section located corresponding and oriented to the first end and a mounting section located adjacent to the second end;

a retaining member including a main body fitted in the fitting section, at least one extended section forward extended from the main body, and at least one elastic section; the extended section being provided with a hook section upward projected beyond the top wall for retaining a mating female connector thereto; and the elastic section being rearward extended from the main body in a direction opposite to the extended section to be located in the mounting section; and a linkage assembly being connected to the mounting section of the connector to hold the retaining member in place between the mounting section and the linkage assembly; the linkage assembly including a first linking member and a second linking member; the second linking member being connected to the first linking member and the connector; and the first linking member being located above the elastic section and including a pressing section; and wherein when the second linking member is pulled rearward, it brings the first linking member to move simultaneously for the pressing section of the first linking member to push the elastic section downward, so that the main body, the extended section and the hook section are brought to elastically bias downward by a distance simultaneously, wherein the fitting section includes a connecting slot formed at a rear central area of the fitting section farther away from the mounting section to downward extend through the fitting section in a thickness direction thereof; the connecting slot being communicable with the mounting section; and the second linking member having an end connected to the connecting slot, wherein the first linking member is formed with an extend-through slot, which extends from a top to a bottom of the first linking member and is communicable with the mounting section; and the end of the second linking member for connecting to the connecting slot being a connecting section, which is sequentially extended through the first linking member, the elastic section and the connecting slot and then turned upward to extend through the extend-through slot before being turned downward to extend the connecting slot again to extend out of the first linking member into the receiving recess of the mounting section.

2. The connector with linked retaining mechanism as claimed in claim 1, wherein the retaining member further includes a driven section, which is extended from the main body in a direction opposite to the extended section; and wherein the retaining member includes two symmetrically arranged elastic sections, which are slantly downward extended from the main body by a predetermined distance in a direction opposite to the extended section and then bent to extend in a horizontal direction.

3. The connector with linked retaining mechanism as claimed in claim 2, wherein the elastic sections of the retaining member respectively include a bent section in the form of a bending line, at where the elastic sections are angularly bent to extend toward the mounting section; and the elastic sections respectively being divided by the bent sections into a first segment and a second segment extended from the first segment, and the first and the second segments being located at different height positions relative to the main body.

4. The connector with linked retaining mechanism as claimed in claim 2, wherein the mounting section of the connector is formed with a receiving recess for receiving the rearward extended elastic sections and driven section; the receiving recess including a recessed bottom surface extended in parallel to the top wall and two guiding rails sideward sunken into two laterally opposite sides of the receiving recess; and the first linking member being provided with sliding blocks corresponding to the guiding rails.

5. The connector with linked retaining mechanism as claimed in claim 3, wherein the first segments of the elastic sections are connected to and downward extended from the main body of the retaining member; the first segments being located corresponding to first pressing areas on the pressing section; and the second segments being connected to and horizontally extended from the first segments.

6. The connector with linked retaining mechanism as claimed in claim 1, wherein the fitting section includes a narrow slot having a free end located near the first end and a fitting groove having a lateral end communicable with the narrow slot; the extended section being extended into and laid in the narrow slot; and the hook section formed on the extended section being extended in a direction opposite to the main body of the retaining member and upward projected beyond the top wall.

7. The connector with linked retaining mechanism as claimed in claim 3, wherein the driven section is located adjacent to the first segments of the elastic sections and includes a pressure receiving segment located corresponding to a second pressing area on the pressing section; and the driven section being caused to move when the second pressing area pushes against the pressure receiving segment.

8. The connector with linked retaining mechanism as claimed in claim 1, wherein the sidewalls of the connector are respectively provided on an inner side with a horizontal rail, and the circuit board is provided at two laterally opposite sides with a protruded section each; the protruded sections being engaged with the horizontal rails to hold the circuit board in place in the connector; an end of the circuit board being located corresponding to the first end of the connector, such that the first end can be plugged in the mating female connector to form an electrical connection between the connector and the mating female connector; and another opposite end of the circuit board being electrically connected to the cable.

9. A connector with linked retaining mechanism, comprising:

a connector having an enclosure including a top wall, two sidewalls, a first end, and a second end; the first end and the second end being located on a surface of the top wall opposite to the sidewalls and located corresponding to a front and a rear part of the top wall, respectively, for receiving a circuit board and a cable, respectively; and the top wall being provided with a fitting section located corresponding and oriented to the first end and a mounting section located adjacent to the second end;

a retaining member including a main body fitted in the fitting section, at least one extended section forward extended from the main body, and at least one elastic section; the extended section being provided with a hook section upward projected beyond the top wall for retaining a mating female connector thereto; and the elastic section being rearward extended from the main body in a direction opposite to the extended section to be located in the mounting section; and a linkage assembly being connected to the mounting section of the connector to hold the retaining member in place between the mounting section and the linkage assembly; the linkage assembly including a first linking member and a second linking member; the second linking member being connected to the first linking member and the connector; and the first linking member being located above the elastic section and including a pressing section; and wherein when the second linking member is pulled rearward, it brings the first linking member to move simultaneously for the pressing section of the first linking member to push the elastic section downward, so that the main body, the extended section and the hook section are brought to elastically bias downward by a distance simultaneously, wherein the retaining member further includes a driven section, which is extended from the main body in a direction opposite to the extended section; and wherein the retaining member includes two symmetrically arranged elastic sections, which are slantly downward extended from the main body by a predetermined distance in a direction opposite to the extended section and then bent to extend in a horizontal direction, wherein the mounting section of the connector is formed with a receiving recess for receiving the rearward extended elastic sections and driven section; the receiving recess including a recessed bottom surface extended in parallel to the top wall and two guiding rails sideward sunken into two laterally opposite sides of the receiving recess; and the first linking member being provided with sliding blocks corresponding to the guiding rails.

* * * * *